Dec. 2, 1924.
L. J. HIBBARD
SYSTEM OF CONTROL
Filed Nov. 13, 1919
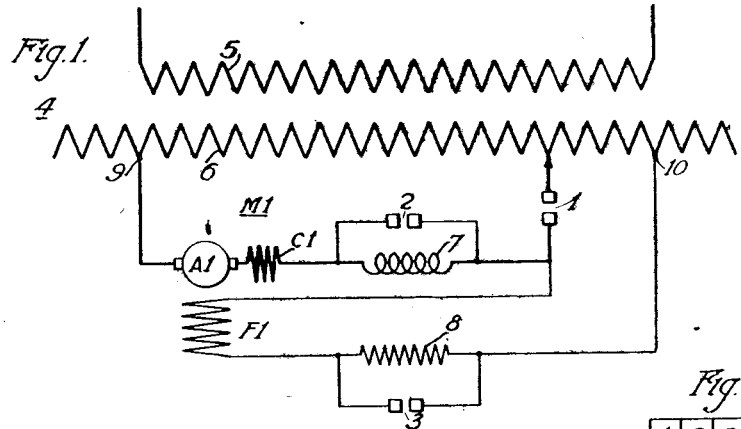
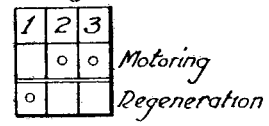
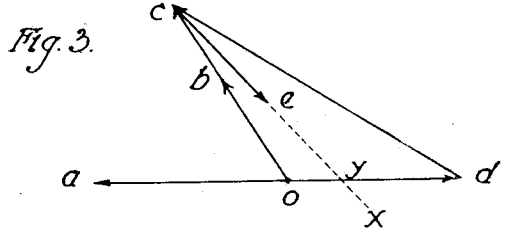
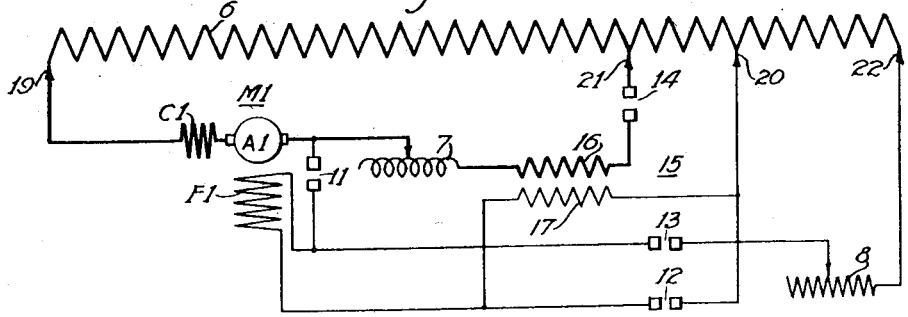
WITNESSES:
INVENTOR
Lloyd J. Hibbard
BY
ATTORNEY Patented Dec. 2, 1924.

1,517,290

UNITED STATES PATENT OFFICE.

LLOYD J. HIBBARD, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed November 13, 1919. Serial No. 337,655.

*To all whom it may concern:*

Be it known that I, LLOYD J. HIBBARD, a citizen of the United States, and a resident of Wilkinsburg, in the county of Allegheny and State of Pennsylvania, have invented a new and useful Improvement in Systems of Control, of which the following is a specification.

My invention relates to systems of control, and it has special relation to the regenerative control of alternating-current motors of the commutator type.

One object of my invention is to provide auxiliary means, in the form of a reactor and a resistor, that are connected in the machine circuits in such manner that regenerative action of a momentum-driven machine may be effected without the employment of a phase-converter or the like for varying the angle of the field excitation.

Another object of my invention is to provide a relatively simple switching arrangement for effecting the above-mentioned change in operation, whereby a series-connected machine, during the motoring period, is reconnected as a shunt-excited machine during regeneration.

Another object of my invention is to provide a system of the above-indicated character wherein the building up of low-frequency alternating current or of direct current in the regenerative circuits is prevented, and, furthermore, undesirable regenerative surges are obviated.

Further objects of my invention will become evident from the following detailed description, taken in conjunction with the accompanying drawing, wherein—

Figure 1 is a diagrammatic view of the main circuits of a system of control organized in accordance with the present invention;

Fig. 2 is a sequence chart of well-known form, indicating the desired order of operation of the illustrated switches;

Fig. 3 is a vector diagram indicating the various phase relations that obtain in the regenerative control system; and Fig. 4 and Fig. 5 are views, respectively, corresponding to Fig. 1 and Fig. 2, of a modified form of the invention.

Referring to Fig. 1 of the drawing, the system here shown comprises an alternating-current commutator motor M1 having an armature A1, a main or exciting field winding F1 and a compensating or inducing field winding C1, together with a plurality of switches 1, 2 and 3 for making the desired connections, including those to a supply transformer 4 having a primary winding 5 and a secondary winding 6 from which the motor M1 is energized. A reactor 7 and a resistor 8 are employed, under regenerative conditions, for phase-adjusting purposes to be set forth. The switches 2 and 3 are connected across the reactor 7 and the resistor 8, respectively, to short-circuit them during the motoring periods, as indicated by the sequence chart, Fig. 2.

Under accelerating or motoring conditions, therefore, the motor circuit is established from a tap-point 9 on the secondary transformer winding 6, through the armature A1, inducing field winding C1, switch 2, exciting field winding F1 and switch 3, to a second tap-point 10 on the secondary transformer winding. The machine is thus connected as a series motor, and the reactor 7 and the resistor 8 are short-circuited.

It will be understood that any well-known accelerating scheme may be applied to the motor M1 to operate it during the motoring period and, consequently, it is deemed unnecessary to describe any particular accelerating system here.

If it is desired to effect regeneration, for example, when the vehicle upon which the motor M1 is mounted is traveling down hill, the master controller (not shown) or other governing means is actuated to open the switches 2 and 3, and close the switch 1, as indicated in the sequence chart, Fig. 2, under the heading "Regeneration." At this time, therefore, the machine is changed into a shunt-excited machine by means of a single switch 1 that connects a point intermediate the armature A1 and the exciting field winding F1 to an intermediate point in the secondary transformer winding 6.

The armature circuit may thus be traced from the tap-point 9 through armature A1, inducing field winding C1, reactor 7 and switch 1 to the transformer winding 6, while the exciting-field-winding circuit branches away from switch 1 to include the field winding F1, resistor 8 and transformer tap-point 10.

The insertion of the reactor 7 in the armature circuit and the resistor 8 in the field-winding circuit serves to vary the phase relations of the armature current and the field-winding current with respect to the supply transformer voltage in such manner that effective regeneration to the transformer winding 6 may be produced. Such relations are graphically illustrated in Fig. 3, wherein—

$oa$ = the voltage impressed from the transformer winding 6 across the circuit including exciting field winding F1 and resistor 8.

$ob$ = the current and flux set up in the exciting field winding F1.

$oc$, in phase with $ob$ = the counter-electromotive force that is set up in the armature A1 by reason of the armature conductors cutting the main field flux when the armature is momentum-driven, as under regenerative conditions.

$od$ = the transformer winding voltage that is impressed across the armature terminals.

Therefore, $cd$, the vectorial sum of $oc$ and $od$ = the resultant voltage across the regenerating armature which must be consumed by the impedance drop of the circuit.

$ce$ = the armature current.

Therefore,

Angle $bce$ = the phase difference between the armature and the field winding currents. The angle $bce$ may be varied as desired to effect regeneration at a selected power-factor by varying any or all of the following quantities. (The power-factor is indicated by the angle $xyd$ between the vectors representing the armature current and the supply transformer voltage).

(a)—Angle $aob$, representing the phase difference between the line voltage and the exciting field current, which angle may, therefore, be adjusted by means of the resistor 8, (b)—Angle $ccd$, representing the phase difference between the armature current and armature voltage, which angle may be adjusted through the agency of the reactor 7; or by varying either of the quantities represented by the (c, d)—Vectors $oc$ and $ob$, corresponding to the counter-electromotive force set up in the armature and the transformer voltage that is impressed across the armature terminals.

Consequently, the insertion of properly designed translating devices, such as the reactor 7 and the resistor 8, in the armature and the field-winding circuits, respectively, serves to render regenerative action available without requiring the use of a phase-converting machine for the exciting field winding.

Referring now to Fig. 4, the system shown comprises the motor M1, the secondary transformer winding 6, the reactor 7, the resistor 8, and, in addition, a plurality of switches 11 to 14, inclusive, and an auxiliary transformer 15, having a primary winding 16 and a secondary winding 17, for a purpose to be set forth.

As indicated in Fig. 5, the switches 11 and 12 are closed during the motoring periods, whereby a circuit is established from the transformer tap 19 through inducing field winding C1, armature A1, switch 11, field winding F1 and switch 12 to transformer tap 20. For accelerating purposes, therefore, the illustrated alternating-current motor is connected as a straight series machine. In the present instance, the reactor 7 and the resistor 8 are entirely disconnected from the motor circuits during the accelerating period, instead of being short-circuited as is the case in the system shown in Fig. 1.

For regenerative operation, the switches 11 and 12 are opened, while the switches 13 and 14 are closed, as indicated in the sequence chart, whereby separate armature and field-winding circuits are completed as follows. The armature circuit is established from the transformer tap-point 19 through inducing field winding C1, armature A1, variable inductor 7, primary winding 16 of the auxiliary transformer 15 and switch 14 to an intermediate transformer tap-point 21.

The field-winding circuit is established from tap-point 20 through secondary winding 17 of the auxiliary transformer, exciting field winding F1, switch 13 and variable resistor 8 to an outer tap-point 22. The desired regenerative operation will thus be effected in accordance with the phase relations that obtain in the vector diagram, Fig. 3, as already explained, and, in addition, the connection of the exciting field winding F1 to the transformer winding 6 in the system of Fig. 4 is such that any low-frequency alternating currents that tend to build up will inherently counteract or buck themselves down and thus obviate this undesirable operation, which has occurred in certain alternating-current, single-phase regenerative systems of the prior art.

Furthermore, the inductive interlinking of the separate armature and field-winding circuits by means of the auxiliary transformer 15 tends to render the machine operation more stable during the regenerative period by entirely preventing or, at least, "ironing out" current surges.

I do not wish to be restricted to the specific circuit connections or arrangement of parts herein set forth, as various modifications thereof may be made without departing from the spirit and scope of my invention. I desire, therefore, that only such limitations shall be imposed thereon as are indicated in the appended claims.

I claim as my invention:

1. The combination with an alternating-current commutator machine having an armature and an exciting field winding, of means for changing from a series machine to a shunt-excited machine, a reactor, a resistor, and means operative concurrently with such change for inserting said reactor and said resistor in the respective circuits.

2. The combination with an alternating-current commutator machine having an armature and an exciting field winding, of means for changing from a series machine during motoring to a shunt-excited machine during regeneration, a reactor, a resistor, and means operative concurrently with such change for inserting said resistor in the field-winding circuit and said reactor in the armature circuit.

3. The combination with an alternating-current commutator machine having an armature and an exciting field winding, of a single switch for changing from a series machine to a shunt-excited machine, a reactor, a resistor, and means for inserting said reactor and said resistor in the respective circuits concurrently with said change.

4. The combination with an alternating-current commutator machine having an armature and an exciting field winding, of a single switch for changing from a series machine during motoring to a shunt-excited machine during regeneration, a reactor, a resistor, and means for inserting said resistor in the field-winding circuit and said reactor in the armature circuit concurrently with such change.

5. The combination with a supply transformer winding and an alternating-current commutator machine having an armature and an exciting field winding connected in series relation therewith during motoring periods, of a switch for joining a point intermediate the armature and field winding to an intermediate point in said transformer winding, a reactor, a resistor, and means for inserting said reactor in the armature circuit and said resistor in the field-winding circuit under regenerative conditions.

6. The combination with an alternating-current commutator machine having an armature and an exciting field winding, of means for changing from a series machine to a shunt-excited machine having separate armature and field-winding circuits, means in the respective circuits for shifting the phase relations of the armature current and of the field-winding current concurrently with such change, and means for inductively interlinking said separate circuits.

7. The combination with a supply transformer winding, and an alternating-current commutator machine having an armature and an exciting field winding, of means comprising two switches for connecting said armature and said field winding in series relation with said transformer winding during motoring periods, a resistor, a reactor, and means for effecting regeneration including means comprising a third switch for connecting said armature and said reactor to the transformer winding, means comprising a fourth switch for connecting said resistor and said field winding to the transformer winding and an auxiliary transformer having its respective windings in circuit with said armature and said field winding.

8. The combination with a supply transformer winding, and an alternating-current commutator machine having an armature and an exciting field winding, of means comprising two switches for connecting said armature and said field winding in series relation with said transformer winding during motoring periods, a resistor, a reactor, and means for effecting regeneration including means comprising a third switch for connecting said armature and said reactor to the transformer winding, means comprising a fourth switch for connecting said resistor and said field winding to the transformer winding separately from the armature circuit, and an auxiliary transformer having its respective windings in circuit with said third switch and connected across one of said two switches.

In testimony whereof, I have hereunto subscribed my name this 30th day of Oct., 1919.

LLOYD J. HIBBARD.